United States Patent [19]

Habermayr et al.

[11] Patent Number: 5,796,987
[45] Date of Patent: Aug. 18, 1998

[54] EMULATION DEVICE WITH MICROPROCESSOR-BASED PROBE IN WHICH TIME-CRITICAL FUNCTIONAL UNITS ARE LOCATED

[75] Inventors: Erwin Habermayr, Oberhausen; Christian Huebner, Dachau; Juergen Hofmeister, Freising; Dieter Horak, Moosburg; Werner Pichl, Eching; Wolfgang Schmitt, Freising, all of Germany

[73] Assignee: Hitex-Systementwicklung, Karlsruhe, Germany

[21] Appl. No.: 723,117

[22] Filed: Sep. 30, 1996

[30] Foreign Application Priority Data

Sep. 30, 1995 [DE] Germany ............... 195 36 622.0

[51] Int. Cl.$^6$ ............................................. G06F 9/455
[52] U.S. Cl. ............... 395/500; 395/183.04; 395/183.05
[58] Field of Search .................... 395/500, 575, 395/183.04; 371/19; 364/488; 439/71

[56] References Cited

U.S. PATENT DOCUMENTS

| | | | |
|---|---|---|---|
| 5,228,039 | 7/1993 | Knoke et al. | 371/19 |
| 5,325,512 | 6/1994 | Takahashi | 395/500 |
| 5,375,228 | 12/1994 | Leary et al. | 395/575 |
| 5,526,275 | 6/1996 | Enomoto | 364/488 |
| 5,537,536 | 7/1996 | Groves | 395/183.04 |
| 5,539,901 | 7/1996 | Ramirez | 395/500 |
| 5,564,041 | 10/1996 | Matsui et al. | 395/500 |
| 5,571,021 | 11/1996 | Kawabe et al. | 439/71 |
| 5,572,665 | 11/1996 | Nakabayashi | 395/183.04 |
| 5,581,695 | 12/1996 | Knoke et al. | 395/183.04 |
| 5,657,442 | 8/1997 | Groves | 395/183.04 |

FOREIGN PATENT DOCUMENTS

| | | |
|---|---|---|
| 0 636 976 | 2/1995 | European Pat. Off. |
| 0 652 516 | 5/1995 | European Pat. Off. |
| 34 08 257 | 9/1985 | Germany |
| 40 40 643 | 7/1992 | Germany |

OTHER PUBLICATIONS

*Electronic Design*, Mar. 3, 1988 entitled "In-circuit emulator for 80386 sports real-time capabilities" by Johna Till, pp. 41–42.

Technical Documentation—KSE 5 Emulator—Hardware Reference Manual KSE-5700-01, Jan. 1989.

*Primary Examiner*—Kevin J. Teska
*Assistant Examiner*—Russell W. Frejd
*Attorney, Agent, or Firm*—Evenson, McKeown, Edwards & Lenahan P.L.L.C.

[57] ABSTRACT

In an emulation device for emulating a target system with a system emulator to which an external emulator probe is connected, which has located therein a central processing unit and which is plugged into the target system in place of the target system processor in order to connect the target system with the system emulator, the functional units of the system emulator for performing time critical functions are combined into an integrated module and moved to the probe.

2 Claims, 2 Drawing Sheets

EMULATION DEVICE WITH MICROPROCESSOR-BASED PROBE IN WHICH TIME-CRITICAL FUNCTIONAL UNITS ARE LOCATED

BACKGROUND AND SUMMARY OF THE INVENTION

The invention relates to an emulation device and, in particular, to an emulation device for emulating a target system with a system emulator to which an external host is connected. The device has a central processing unit and is capable of being plugged into the target system instead of the target system processor in order to link the target system with the system emulator.

An emulation device of the above-mentioned type is known for example from the KSE 5 emulator made by Kontron Elektronik GmbH (Hardware Reference Manual KSE-5700-01, January 1989). A known emulation device of this type is shown schematically in FIG. 1. A system emulator 1 has a plurality of electronic boards 2, connected with one another by a backplane 3. System emulator 1 is connected by a connecting section 8 with a host 4, usually a personal computer.

System emulator 1 is connected by an additional connecting section 7 with an emulator probe 5 on which a central processing unit 6 is mounted. Emulator probe 5 with the central processing unit 6 can be plugged into a target system 11 instead of the target system processor. Target system 11 is a processor-controlled application circuit for example. Connecting section 7 in the form of a cable system preferably has a length of approximately one meter for flexible handling of emulator probe 5. For example, if data from target system 11 is transmitted to components of the boards 2, then the signals must traverse emulator probe 5, connecting section 7, and backplane 3. The physical signal travel times can add up as a result of such long signal paths, and result in values longer than one cycle period of the central processor 6 in use. This can result in improper functioning or functional limitations.

The goal of the invention is to improve an emulating device of the above-mentioned type such that malfunctions caused by travel time problems are prevented by minimizing the physical signal travel times.

This goal is achieved according to the invention by an emulation device for emulating a target system with a system emulator to which an external host is connected. The device has a central processing unit and is capable of being plugged into the target system instead of the target system processor in order to link the target system with the system emulator. Functional units of the system emulator for performing time-critical functions are combined into an integrated module and are located in the host.

According to the invention, functional units of the system emulator for performing time-critical functions are combined into at least one integrated module and are located in the emulator probe.

Since all functional units are usually provided on the boards 2 of the system emulator 1, the signal travel times can be significantly reduced by eliminating the route through the backplane 3 and the connecting section 7.

According to the invention, the term "time-critical functions" refers, for example, to a rapid memory access and/or a rapid transfer of commands and data. Thanks to the emulation device according to the invention, the memory access and/or data transfer that takes place in the prior art between the system emulator 1 and the target system 11 is now conducted solely in the emulator probe or between the emulator probe and the target system. To shorten the signal travel times, the device according to the invention has the further advantage that defective signal transmissions caused by external disturbing influences, such as electromagnetic radiation for example, are eliminated by skipping the signal path through the connecting section 7.

An advantageous feature of the invention has an additional functional unit provided in an integrated module. The unit comprises a data transfer intermediate memory for a bi-directional, blockwise data and/or command transmission between the target system and the host.

This also results in a more rapid transfer of data and commands between the target system and the host by comparison with a previously conventional transfer of individual data and/or individual commands.

Other objects, advantages and novel features of the present invention will become apparent from the following detailed description of the invention when considered in conjunction with the accompanying drawings.

DETAILED DESCRIPTION OF THE DRAWINGS

Figure 1:
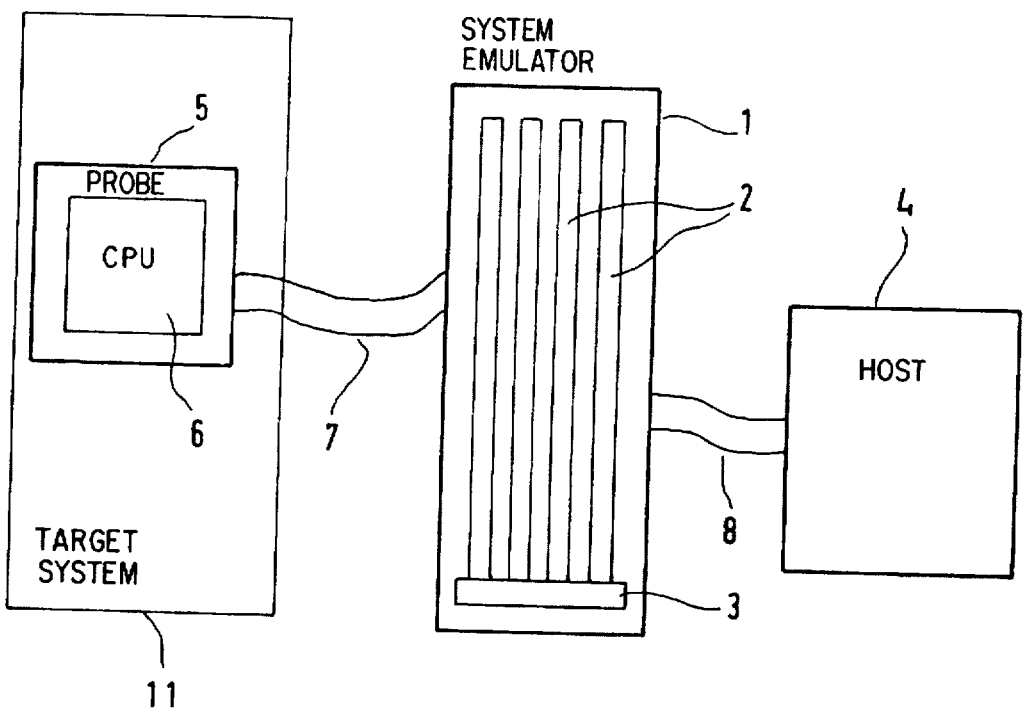
FIG. 1 is an overall schematic block diagram of a prior art emulation device.
Figure 2:
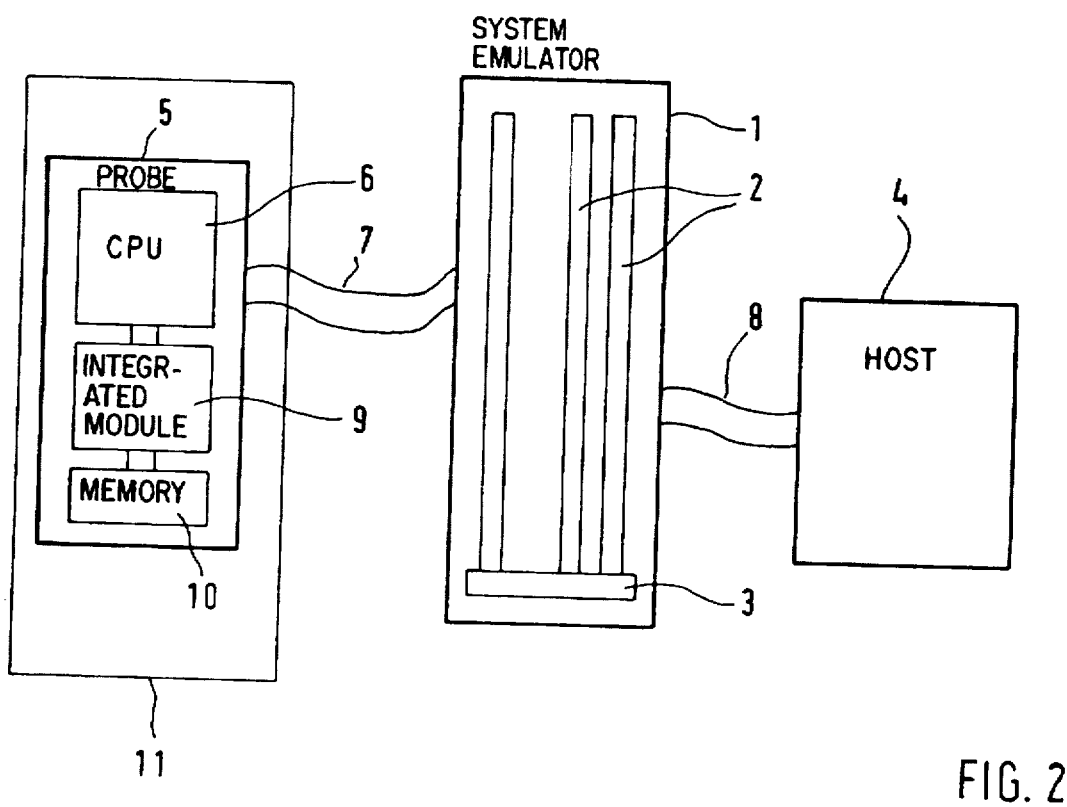
FIG. 2 is an overall schematic block diagram of an emulation device according to the present invention.

In FIG. 2, the parts that correspond to those in FIG. 1 have been given the same reference numbers. FIG. 2 differs from the prior art shown in FIG. 1 in that emulator probe 5 has an integrated module 9 and a memory 10 in addition to the central processor 6. Integrated module 9, for example, can be an ASIC (Application Specific Integrated Circuit) or a programmable integrated logic module, for example an FPGA, EPLD, PLD, etc. Functional units for performing time-critical functions, which are contained in boards 2 in the prior art, have been moved to the integrated module 9 in FIG. 2. Memory 10 can be provided optionally on emulator probe 5, for example as a simulation or monitoring program memory.

The possibility of optional functional expansions in system emulator 1 is created by providing significant function scopes, said function expansions not being integratable into emulator probe 5 because of the size of the modules. For example, if memory 10 on emulator probe 5 is insufficient for investigating large programs of the target system 11 for example, a large simulation memory and/or a large memory for recording the program performed by the target system 11 can be provided in system emulator 1. Future functional expansions also can be implemented very rapidly in system emulator 1 by new boards, since a new design for emulator probe 5 or integrated module 9 is not required each time a change is made. This results in a very flexible overall emulation device.

Figure 3:
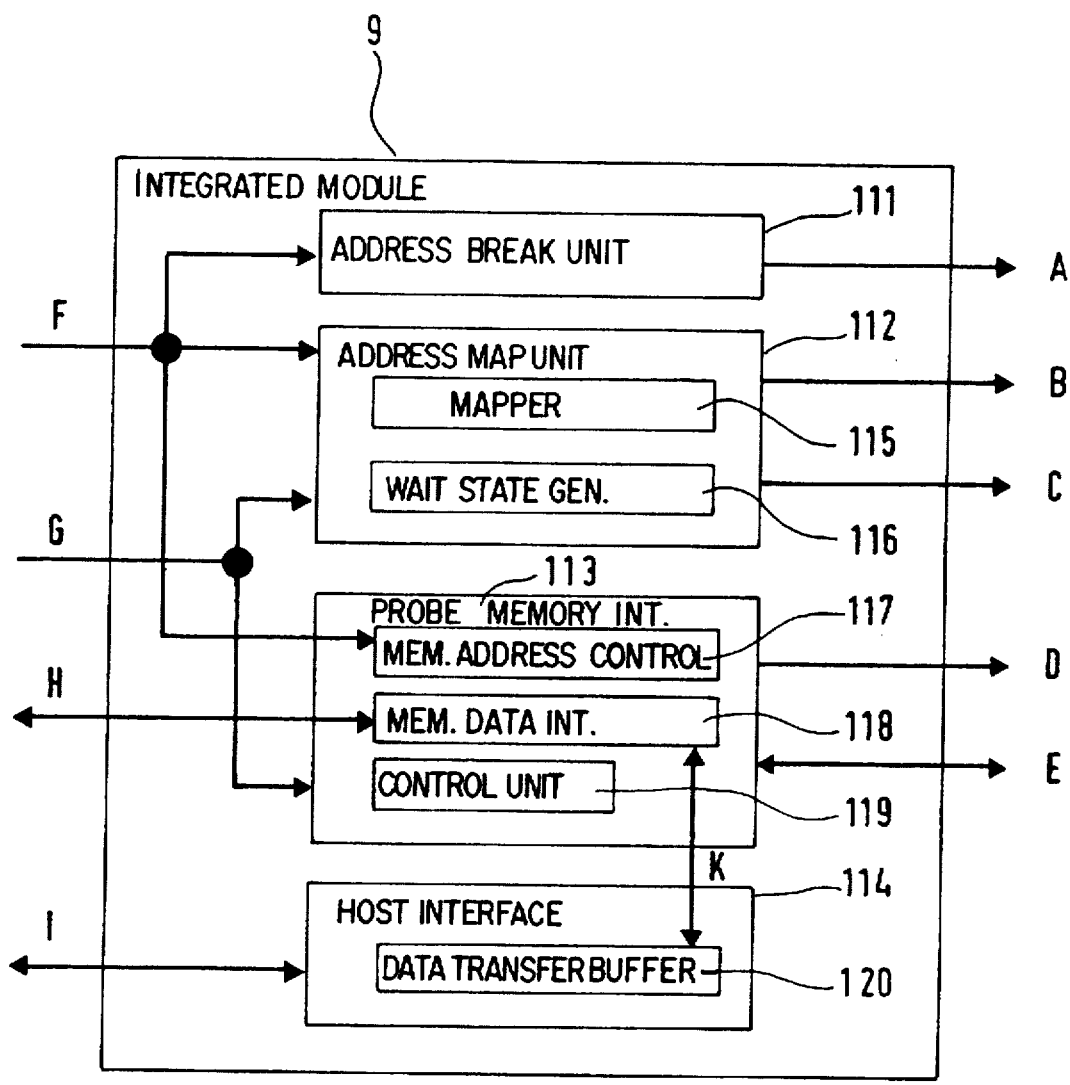
FIG. 3 is a schematic block diagram of functional units of the system emulator mounted on the integrated module according to the invention.

FIG. 3 shows examples of functional units transferred to module 9, such as an address break unit 111, an address map unit 112, a probe memory interface 113 for memory 10, and a host interface 114 for emulator operating unit 4.

Address break unit 111 generates a break signal before the access of the simulation processor 6 to a selected address can be completed ("break before execute").

Address map unit 112 consists of a mapper 115 and a wait state generator 116. Mapper 115 isolates data buses for emulation processor 6 to access predetermined address blocks in the target system 11 or in the memory 10. Wait state generator 116 generates a wait signal of a duration that can be adjusted by the user by means of the host 4 when an emulation processor 6 is accessing a selected address block.

Probe memory interface 113 for memory 10 of emulator probe 5 has a memory address control 117, a memory data interface 118, and a control unit 119. Memory address control 117 controls the access of the central processing unit 6 to the memory 10 of the emulator probe 5. Memory data interface 118 transmits data between interface unit 113 and memory 10. Control unit 119 adjusts the data bus size as a function of the selected memory areas.

The functions combined in integrated module 9 can be adjusted by the user by using interface unit 114 for host 4. Probe memory interfaces 113 and 114 exchange data through a communication bus K.

Integrated module 9 has a plurality of inputs and outputs A to I. Break signals A are transmitted through the output of address break unit 111, while address block signals B and control signals C are transmitted through the outputs of address map unit 112. Address bus D is connected to memory 10 at the output of memory address control 117. Input and output signals from memory data interface unit 118 are transmitted to memory 10 through bi-directional data bus E. There is also bi-directional signal traffic between memory data interface unit 118 and central processing unit 6 through central processing unit data bus H. There is also a bi-directional link I between interface unit 114 and host 4. Interface unit 114 has a data transfer buffer 120 which performs rapid data exchange or an exchange of program commands between host 4 and target system 11 or between host 4 and memory 10.

Blockwise exchange of data and commands can be performed by interface unit 114 and data transfer buffer 120 between host 4 and target system 11, instead of the previously conventional individual data transfer. This reduces the transmission frequency as well as the total transmission time for transferring data and commands between host 4 and target system 11. The time during which the emulation program execution must be interrupted during this transfer of data and commands is also reduced.

A CPU address bus F transmits input signals to address break unit 111, address map unit 112, and memory address control 117. CPU control signals G are the input signals from address map unit 112 and interface unit 113.

A considerable reduction of signal travel times during memory accesses is achieved by the integrated module 9 mounted on emulator probe 5, with functional units 111, 112, 113, and 114 for performing time-critical functions. The execution of monitoring programs that run while the execution of the program under test in the target system 11 is suspended can be significantly accelerated.

The following is a list of German/English translations of the terms used in the embodiment, since the majority of the literature for emulation devices is in the English language.

| | |
|---|---|
| Emulator-Haupteinheit 1 | = System Emulator |
| Elektronische Steckkarten 2 | = Boards |
| Ruckwandverdrahtung 3 | = Backplane |
| Emulatorbedieneinheit 4 | = Host |

-continued

| | |
|---|---|
| Steckeinheit 5 | = Emulator Probe |
| Emulationsprozessor 6 | = Central Processing Unit (CPU) |
| Speicher 10 | = Probe Memory |
| Zielsystem 11 | = Target System |
| Emulatorzentraleinheit 12 | = In-Circuit Emulator |
| Unterbrechungssignalerzeugungseinheit 111 | = Address Break Unit |
| Adreßblockauswahleinheit 112 | = Address Map Unit |
| Schnittstelleneinheit 113 zum Speicher 10 | = Probe Memory Interface |
| Schnittstelle 114 zur Eumulatorbedieneinheit 4 | = Host Interface |
| Datenbusfreischaltungseinheit 115 | = Mapper |
| Wartesignalerzeugungseinheit 116 | = Waitstate Generator |
| Speicheradreßsteuereinheit 117 | = Memory Address COntrol |
| Datenschnittstelle 118 zum Speicher 10 | = Memory Data Interface |
| Steuereinheit 119 zur Einstellung der Datenbusbreite | = Bus Size Control |
| Datentransferzwischenspeicher 120 | = Data Transfer Buffer |
| Unterbrechungssignale A | = Break Signals |
| Adreßblocksignale B | = Map Signals |
| Steuersignale C | = Control Signals |
| Adreßbus D zum Speicher 10 | = Probe Memory Address Bus |
| Datenbus E zum Speicher 10 | = Probe Memory Data Bus |
| Emulationsprozessor-Adreßbus F | = CPU Address Bus |
| Emulationsprozessor-Steuersignal-bus G | = CPU Control Signals |
| Emlationsprozessor-Datenbus H | = CPU Data Bus |
| Datentransferbus I zur Emulatorbedieneinheit 4 | = Host Interface Bus |

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An emulation device for emulating a target system with a system emulator to which an external host is coupled, comprising:

an emulator probe including an emulation processor, said emulator probe connecting to the system emulator and being plugable into the target system instead of a target system processor in order to couple the target system with the system emulator;

wherein said emulator probe further has located therein an address map unit and a probe memory interface which perform time critical functions, as well as a host interface directly connected to the external host, said address memory unit, probe memory interface and host interface being combined into an integrated module, whereby the time critical functions are shifted to said emulator probe from the system emulator.

2. The emulation device according to claim 1, wherein said host interface located in said integrated module comprises a data transfer buffer memory for bi-directional blockwise transmission of data and commands between the target system and the external host.

* * * * *